United States Patent
Nier et al.

(10) Patent No.: US 9,743,581 B1
(45) Date of Patent: Aug. 29, 2017

(54) COMMERCIAL WALK BEHIND MOWER OPERATOR CONTROLS

(71) Applicant: Deere & Company, Moline, IL (US)

(72) Inventors: Mark Nier, Chilton, WI (US); Ronald L. Reichen, Raleigh, NC (US)

(73) Assignee: DEERE & COMPANY, Moline, IL (US)

( * ) Notice: Subject to any disclaimer, the term of this patent is extended or adjusted under 35 U.S.C. 154(b) by 22 days.

(21) Appl. No.: 15/019,345

(22) Filed: Feb. 9, 2016

(51) Int. Cl.
 B60K 26/00 (2006.01)
 A01D 34/00 (2006.01)
 A01D 34/66 (2006.01)
 A01D 101/00 (2006.01)

(52) U.S. Cl.
 CPC .......... *A01D 34/006* (2013.01); *A01D 34/664* (2013.01); *A01D 2101/00* (2013.01)

(58) Field of Classification Search
 CPC ............ A01D 34/6806; A01D 2101/00; A01D 2034/6843; Y10S 56/18
 USPC ............... 180/19.1, 19.2, 19.3, 315
 See application file for complete search history.

(56) References Cited

U.S. PATENT DOCUMENTS

| | | | |
|---|---|---|---|
| 4,879,867 A | 11/1989 | Wenzel | |
| 4,920,733 A | 5/1990 | Berrios | |
| 4,967,543 A * | 11/1990 | Scag | A01D 34/69 56/10.8 |
| 5,020,308 A | 6/1991 | Braun et al. | |
| 5,077,959 A | 1/1992 | Wenzel | |
| 5,127,215 A * | 7/1992 | Wenzel | A01D 34/6806 180/19.1 |
| 5,138,824 A | 8/1992 | Oshima et al. | |
| 5,155,985 A | 10/1992 | Oshima et al. | |
| 5,343,678 A | 9/1994 | Stuart | |
| 5,375,674 A * | 12/1994 | Peter | A01D 34/6806 180/19.3 |
| 5,511,367 A | 4/1996 | Powers et al. | |
| 5,651,241 A | 7/1997 | Wegner | |
| 5,806,374 A * | 9/1998 | Mizutani | A01D 34/6806 56/10.5 |
| 5,809,755 A | 9/1998 | Velke et al. | |
| 5,848,520 A | 12/1998 | Arfstrom et al. | |
| 5,913,802 A | 6/1999 | Mullet et al. | |
| 5,915,487 A * | 6/1999 | Splittstoesser | B62D 51/04 180/19.1 |
| 6,098,385 A * | 8/2000 | Turk | A01D 34/6806 56/11.1 |
| 6,105,348 A * | 8/2000 | Turk | A01D 34/68 180/19.3 |
| 6,341,479 B1 | 1/2002 | Scag et al. | |
| 6,557,331 B2 | 5/2003 | Busboom et al. | |
| 6,868,657 B2 | 3/2005 | Bauer et al. | |
| 6,935,446 B2 | 8/2005 | Walker | |
| 6,951,092 B2 | 10/2005 | Busboom et al. | |
| 7,063,177 B1 | 6/2006 | Crumly | |
| 7,740,091 B2 | 6/2010 | Bartel | |

(Continued)

*Primary Examiner* — Toan To

(57) ABSTRACT

Commercial walk behind mower operator controls include a rigid handlebar with a pair of hand grips, each hand grip having a non-horizontal axis. A pair of operator control levers are mounted adjacent the handlebar and hand grips. Both operator control levers are pivotable about a single pivot point having a pivot axis that is non-parallel to the axis of each hand grip. Each operator control lever is pivotable toward the hand grip to reduce the rotational speed of a drive wheel.

12 Claims, 3 Drawing Sheets

(56) References Cited

U.S. PATENT DOCUMENTS

| | | | | |
|---|---|---|---|---|
| 8,096,374 B1* | 1/2012 | Papke | ............... | A01D 34/82 |
| | | | | 180/19.3 |
| 8,104,552 B2* | 1/2012 | Papke | ............... | A01D 34/82 |
| | | | | 180/19.3 |
| 9,163,707 B2* | 10/2015 | Helin | ............ | A01D 34/6806 |
| 9,470,305 B2* | 10/2016 | Kaskawitz | ......... | A01D 34/475 |
| 2003/0000190 A1* | 1/2003 | Busboom | ......... | A01D 34/6806 |
| | | | | 56/10.8 |

* cited by examiner

COMMERCIAL WALK BEHIND MOWER OPERATOR CONTROLS

FIELD OF THE INVENTION

This invention relates to commercial walk behind mowers, and specifically to operator controls for commercial walk behind mowers.

BACKGROUND OF THE INVENTION

Commercial walk behind mowers typically are used by landscaping and grounds care professionals. Commercial walk behind mowers have heavy duty floating mower decks that are wide enough for housing two or three rotary cutting blades. Belt drives are commonly used to transmit rotational power from the engine power take off to pulleys on cutting blade spindles. Commercial walk behind mowers also have a pair of drive wheels behind the deck, rotated by a self-propelled drive system. The self-propelled drive system may be a gear drive, belt drive or infinitely variable hydrostatic system for ground speed adjustment.

Commercial walk behind mower operator controls typically include handgrips and operator control levers to rotate the drive wheels and steer the mower by rotating the drive wheels at different speeds. The controls also may include an operator presence system with bails that must be depressed to operate the mower. In the past, many commercial walk behind mower operator controls included a pair of rearwardly extending pistol grips with various grip and lever configurations the operator must squeeze. Examples of these commercial walk behind mower operator controls are shown in U.S. Pat. Nos. 4,879,867; 4,920,733; 5,020,308; 5,077,959; 5,127,215; 5,651,241; 5,848,520 and 6,935,446. Pistol grip operator controls work in a vertical plane and do not place the operator's arms and wrists in an ideal ergonomic position. Other commercial walk behind mower operator controls include a rigid handlebar or support member that is generally horizontal, along with a pair of pivoting levers that move fore and aft to steer the wheels. Examples are shown in U.S. Pat. Nos. 5,511,367; 5,809,755; and 6,868,657. Other designs for commercial walk behind mower operator controls have included horizontal handlebars without rigid support members, such as U.S. Pat. No. 7,740,091. The horizontal handlebar may pivot on a vertical axis, and places the operator's hands in a horizontal plane that is more ergonomically friendly. However, it is more complex, requires more parts that are subject to wear, and requires more service and adjustment from normal use. Other commercial walk behind mower operator controls include a handlebar with hand grips that are inclined upwardly and towards one another, a control lever next to each hand grip, each control lever pivotable about a pivot axis that is substantially parallel to the grip axis of the corresponding hand grip. Examples of these operator controls are shown in U.S. Pat. Nos. 6,557,331 and 6,951,092.

Commercial walk behind mower operator controls are needed that provide an ergonomically friendly operator position for daily mowing work, and provide control functions that are desirable, but with fewer components and wear points. It would be desirable to provide commercial walk behind mower operator controls having a lower cost to manufacture, adjust and repair than existing controls.

SUMMARY OF THE INVENTION

Commercial walk behind mower operator controls include a pair of hand grips, each hand grip having an upwardly inclining axis that converges with the axis of the other hand grip. The controls also include a pair of operator control levers, each operator control lever being pivotable towards one of the hand grips, and both operator control levers pivotable about a single pivot axis that is inclined upwardly on a fore-aft axis of a mower. The controls also may include a pair of operator presence levers, each operator presence lever being pivotable towards one of the hand grips on a pivot axis that is generally perpendicular to the axis of one of the hand grips.

DESCRIPTION OF THE PREFERRED EMBODIMENT

Figure 1:
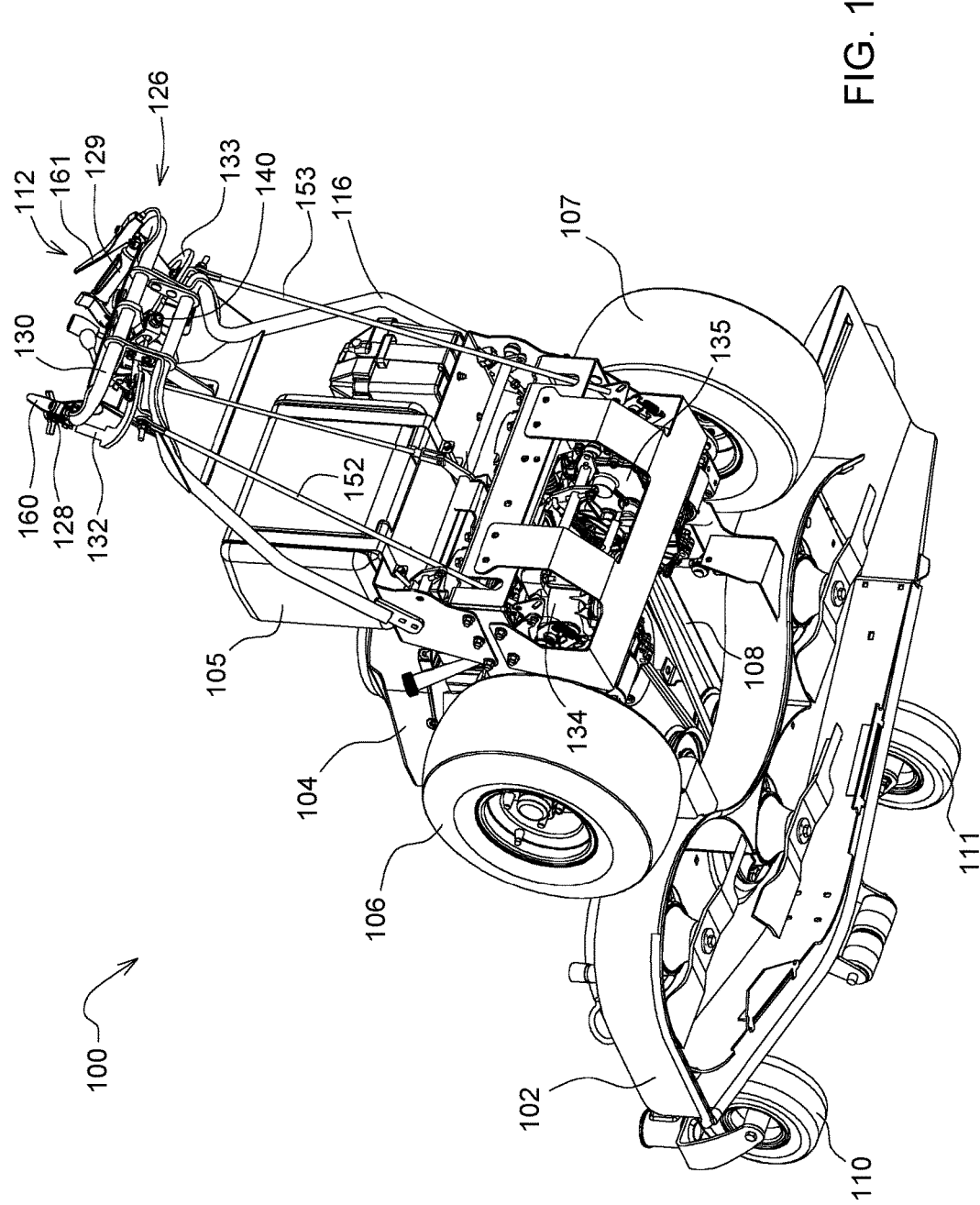
FIG. 1 is a perspective view of a commercial walk behind mower with operator controls according to a first embodiment of the invention.
Figure 2:
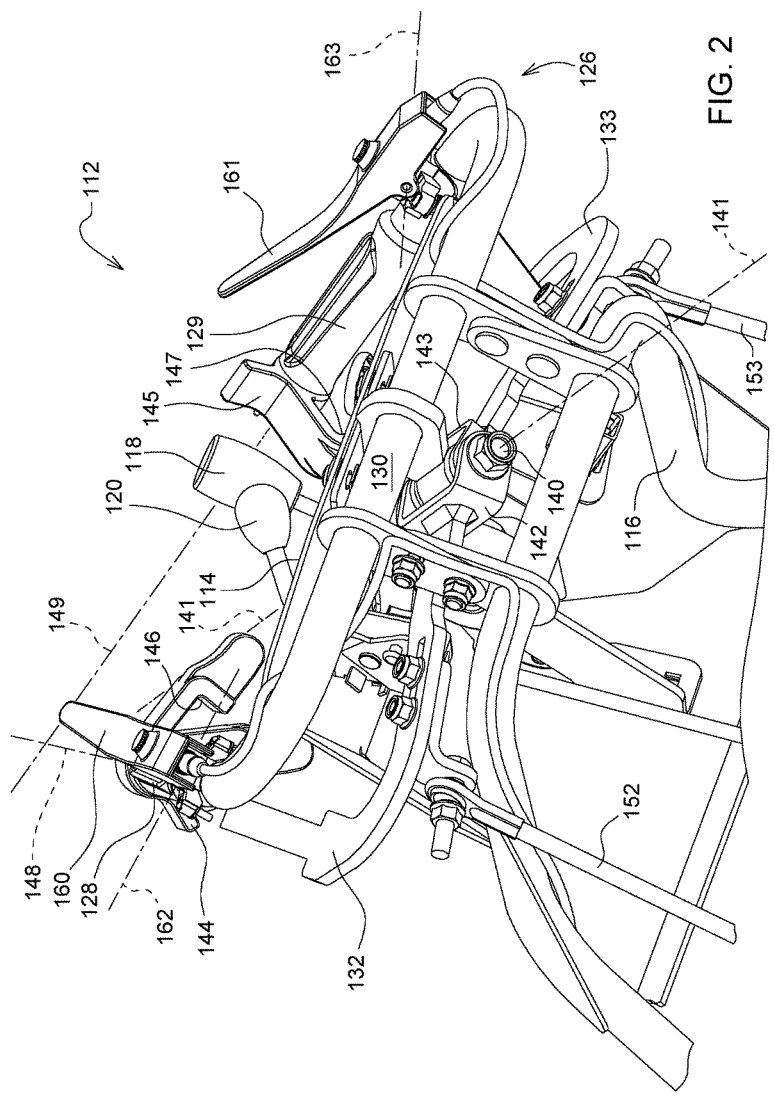
FIG. 2 is a perspective view of commercial walk behind mower operator controls with operator control levers in a first position according to a first embodiment of the invention.
Figure 3:
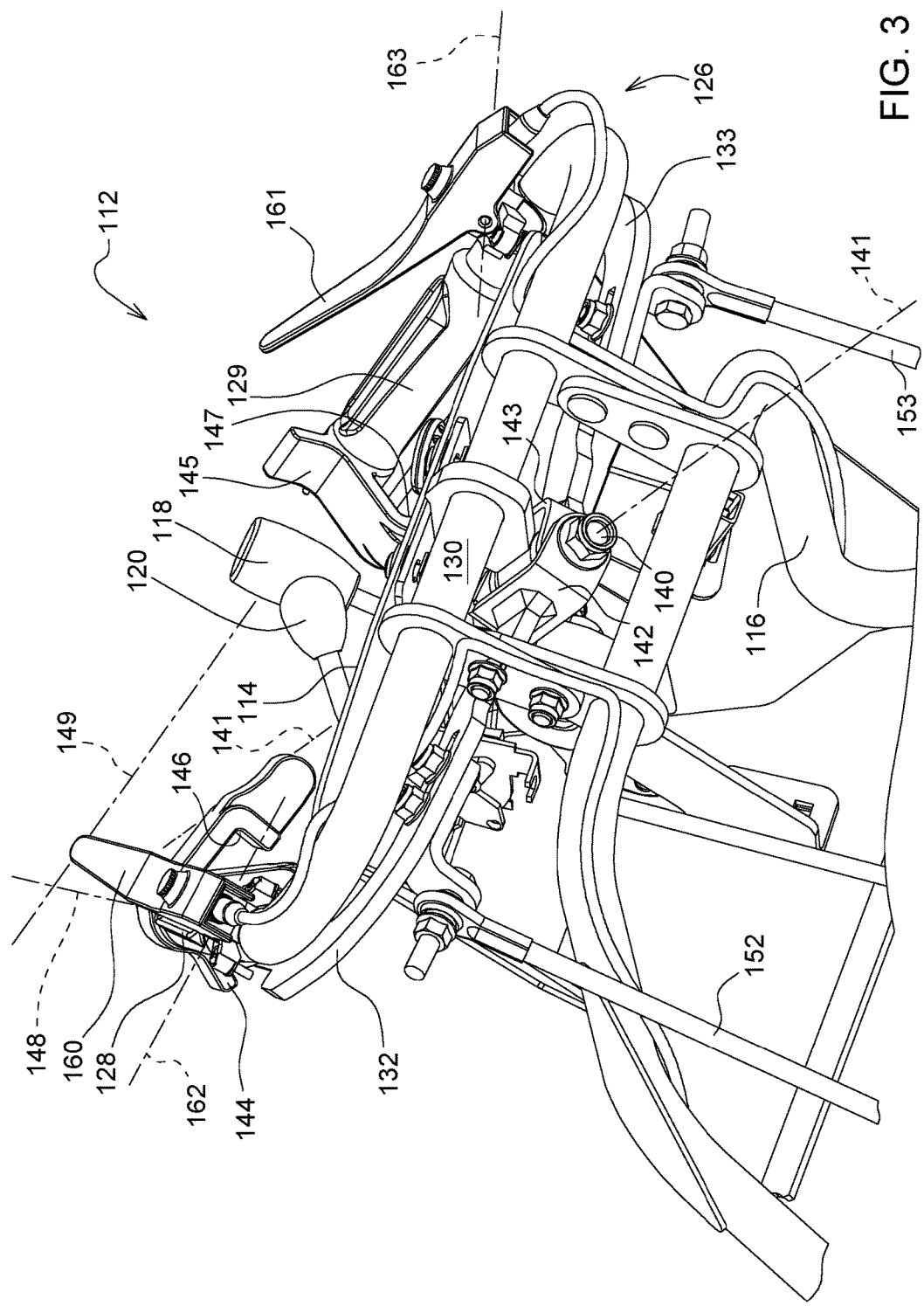
FIG. 3 is a perspective view of commercial walk behind mower operator controls with operator control levers in a second position according to a first embodiment of the invention.

FIGS. 1-3 show an embodiment of commercial walk behind mower 100 with mower deck 102. The mower deck may be heavy duty and have a width sufficient to house two or more rotary cutting blades. The commercial walk behind mower may have internal combustion engine 104 and fuel tank 105 supported by frame members 108. Belt drives may be used to transmit rotational power from the engine to pulleys on the cutting blade spindles. The mower deck may be suspended under the frame members 108 so that it can float or ride on gage wheels. The front of the frame may be supported by caster wheels 110, 111 and the rear of the frame may be supported by a pair of drive wheels 106, 107 positioned behind the deck, rotated by a self-propelled drive system. The self-propelled drive system may be a gear drive, belt drive or infinitely variable hydrostatic system to provide infinitely variable ground speed adjustment.

In one embodiment, commercial walk behind mower operator controls 112 may include console 114 supported by upright support members 116. The support members may extend rearwardly and upwardly from frame 108. Throttle lever 118, transmission lever 120, and one or more functional switches and displays also may be positioned on the console.

In one embodiment, the commercial walk behind mower operator controls may include rigid handlebar 126. The rigid handlebar may connect a pair of hand grips 128, 129. Each hand grip 128, 129 has an axis 148, 149 that inclines upwardly and crosses the axis of the other hand grip. As a result, each hand grip axis 148, 149 points off to the left or right of the mower frame or axis. A horizontal portion 130 of the handlebar may be attached securely to upright support members 116 and connect between the pair of hand grips. The hand grips may be on the opposing ends of the rigid handlebar, so that one of the hand grips is positioned on each side of the console.

In one embodiment, the commercial walk behind mower operator controls include a pair of operator control levers 132, 133 mounted adjacent the handlebar and hand grips. Both operator control levers 132, 133 are independently pivotable about a single pivot point 140 having a central pivot axis 141. The central pivot axis of the operator control levers is inclined upwardly and is in the same plane as the fore-aft axis of the mower and mower frame. The central pivot axis is not parallel or substantially parallel to the axis 148 of hand grip 128, or the axis 149 of hand grip 129.

In one embodiment, the commercial walk behind mower may have a single pivot point 140 in the form of a rod or stud. Pivot point 140 may be centrally positioned behind and below the handlebar 126 and console 114. The rod or stud may extend through openings in U-shaped pivot bracket 142, 143 on the innermost end of each operator control lever. The operator may pivot each operator control lever by squeezing the operator control lever towards the corresponding hand grip.

In one embodiment, the commercial walk behind mower operator controls may include operator control levers that are biased to a first position as shown in FIG. 2. In the first position, each operator control lever 132, 133 may be pivotably spaced from a corresponding hand grip by at least about one inch and preferably at least about two inches. In a second position, as shown in FIG. 3, each operator control lever may be squeezed by the operator toward the corresponding hand grip.

In one embodiment, the commercial walk behind mower operator controls may include a connecting rod 152, 153 extending between each of the operator control levers and a speed control for one of the rear drive wheels. For example, the speed control may be a hydrostatic pump. Alternatively, the speed control may be a gear drive, belt drive or integrated hydrostatic axle. When an operator control lever is in the first position, the connecting rod from the operator control lever to one of the hydrostatic pumps 134, 135 may be fully extended to set the drive wheel speed at a forward or mowing speed. When the operator squeezes one of the operator control levers to the second position, this retracts the connecting rod and slows the hydraulic motor on that side while the other hydraulic motor retains its rotational speed. As a result, the left and right drive wheels may rotate at different speeds to turn the mower. Similarly, the operator may squeeze the operator control lever on the side of the turn direction to provide a braking input to a gear drive, belt drive or integrated hydrostatic axle.

In one embodiment, the commercial walk behind mower operator controls may include neutral locks 144, 145 that are pivotably mounted onto the outward end of each hand grip. The operator may insert each operator control lever in a slot 146, 147 in the neutral lock so that each drive wheel does not rotate. For example, the operator may engage the neutral locks when starting the mower, to allow the mower to sit and idle, or to set the forward speed before releasing the locks to mow. The operator may release the neutral locks so the operator control levers may pivot forwardly to operate the mower at the set forward or mowing speed. For example, the operator control levers may be biased to the forward position by springs acting on the hydraulic pumps.

In one embodiment, the commercial walk behind mower operator controls may include operator presence levers 160, 161. The operator presence levers may be pivotably mounted to the handlebar adjacent and to the rear of handlebar grips 128, 129. Each operator presence lever may have a pivot axis 162, 163 that is not parallel or substantially parallel to the axis 148 of hand grip 128, or the axis 149 of hand grip 129. Instead, the pivot axis 162, 163 of each operator presence lever may be generally perpendicular to the axis of the corresponding hand grip. The operator must squeeze one or both operator presence levers to operate the engine and the mower deck or PTO drive, unless the operator control levers are locked in neutral. If the operator releases the operator presence levers, and the operator control levers are not in neutral, an electrical circuit connected to the operator presence levers shuts off engine ignition and/or the mower deck/PTO drive.

The commercial walk behind mower operator controls of the present invention provide an ergonomically friendly operator position for daily mowing work, and control functions that are desirable, while reducing the number of components and the number of wear points. The cost to manufacture, adjust and repair the operator controls may be reduced as compared to past controls.

Having described the preferred embodiment, it will become apparent that various modifications can be made without departing from the scope of the invention as defined in the accompanying claims.

The invention claimed is:

1. Commercial walk behind mower operator controls, comprising:
    a rigid handlebar with a pair of hand grips; each hand grip having a non-horizontal axis; and
    a pair of operator control levers mounted adjacent the handlebar and the pair of hand grips; both operator control levers pivotable about a single pivot point having a pivot axis that is non-parallel to the axis of each hand grip; each operator control lever being pivotable toward the hand grip to reduce the rotational speed of a drive wheel.

2. The commercial walk behind mower operator controls of claim 1, wherein each operator control lever comprises a U-shaped bracket pivotable on the single pivot point.

3. The commercial walk behind mower operator controls of claim 1, wherein each hand grip has an axis that is inclined upwardly toward the axis of the other hand grip.

4. The commercial walk behind mower operator controls of claim 1, further comprising a pair of operator presence levers adjacent each hand grip; each operator presence lever pivotable on an axis perpendicular to the axis of the adjacent hand grip.

5. Commercial walk behind mower operator controls, comprising:
    a pair of hand grips, each hand grip having an upwardly inclining axis that converges with the axis of the other hand grip;
    a pair of operator control levers, each operator control lever being pivotable towards one of the hand grips, both operator control levers pivotable about a single pivot axis that is inclined upwardly on a fore-aft axis of a mower; and
    a pair of operator presence levers, each operator presence lever being pivotable towards one of the hand grips on a pivot axis that is generally perpendicular to the axis of one of the hand grips.

6. The commercial walk behind mower operator controls of claim 5, wherein the pair of hand grips are on opposing ends of a rigid handlebar.

7. The commercial walk behind mower operator controls of claim 5, further comprising a neutral lock pivotably mounted onto an outward end of each hand grip.

8. The commercial walk behind mower operator controls of claim 5, further comprising a connecting rod between each operator presence lever and a speed control for a drive wheel.

9. Commercial walk behind mower operator controls, comprising:

a handlebar positioned upwardly and rearwardly behind a commercial walk behind mower having a pair of independently driven wheels;

a pair of operator control levers that are both independently pivotable on the same upwardly inclined central axis; each operator control lever controlling the speed of one of the independently driven wheels.

10. The commercial walk behind mower operator controls of claim 9, further comprising a hand grip on each end of the handlebar; each hand grip having a different axis than the upwardly inclined central axis.

11. The commercial walk behind mower operator controls of claim 10, further comprising a pair of operator presence levers mounted to the handlebar, each operator presence lever being pivotable on an axis that is different than the upwardly inclined central axis and is different than the axis of each hand grip.

12. The commercial walk behind mower operator controls of claim 9, further comprising a neutral lock on each end of the handlebar; each neutral lock holding one of the operator control levers in a position controlling the drive wheel not to rotate.

\* \* \* \* \*